United States Patent
Mukai et al.

(10) Patent No.: US 7,397,156 B2
(45) Date of Patent: Jul. 8, 2008

(54) TANDEM ROTARY ELECTRIC MACHINE

(75) Inventors: Takuzou Mukai, Handa (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 23 days.

(21) Appl. No.: 11/480,541

(22) Filed: Jul. 5, 2006

(65) Prior Publication Data
US 2007/0007837 A1  Jan. 11, 2007

(30) Foreign Application Priority Data
Jul. 11, 2005  (JP) .............................. 2005-201763

(51) Int. Cl.
H02K 47/00 (2006.01)
H02K 3/00 (2006.01)
H02K 3/12 (2006.01)

(52) U.S. Cl. .................. 310/112; 310/113; 310/114; 310/180; 310/184; 310/185

(58) Field of Classification Search ............. 310/58, 310/62, 71, 112, 114, 181, 261, 263, 113, 310/180, 184, 185
See application file for complete search history.

(56) References Cited

U.S. PATENT DOCUMENTS

| | | | |
|---|---|---|---|
| 5,177,388 A * | 1/1993 | Hotta et al. ................ | 310/114 |
| 5,233,249 A | 8/1993 | Schaeftlmeier et al. | |
| 5,397,975 A | 3/1995 | Syverson | |
| 5,502,368 A | 3/1996 | Syverson et al. | |
| 5,631,544 A | 5/1997 | Syverson et al. | |
| 5,656,922 A | 8/1997 | LaVelle et al. | |
| 5,693,995 A | 12/1997 | Syverson | |
| 5,710,471 A | 1/1998 | Syverson et al. | |
| 5,747,909 A | 5/1998 | Syverson et al. | |
| 5,753,989 A | 5/1998 | Syverson et al. | |
| 6,236,134 B1 | 5/2001 | Syverson | |
| 6,825,589 B2 * | 11/2004 | Kouda et al. ................ | 310/207 |
| 6,833,648 B2 * | 12/2004 | Gorohata et al. ............ | 310/180 |
| 6,910,257 B1 | 6/2005 | Gprpjata et al. | |
| 6,979,926 B2 | 12/2005 | Ogawa et al. | |
| 6,995,492 B1 | 2/2006 | Kouda et al. | |
| 2002/0079763 A1 * | 6/2002 | Fleshman et al. ............ | 310/87 |
| 2003/0233748 A1 * | 12/2003 | Gorohata et al. ............ | 29/596 |
| 2006/0033394 A1 | 2/2006 | Ogawa et al. | |

FOREIGN PATENT DOCUMENTS

JP 01157251 A * 6/1989

(Continued)

OTHER PUBLICATIONS

US 6,774,528, 08/2004, Kouda et al. (withdrawn)

*Primary Examiner*—Tran Nguyen
(74) *Attorney, Agent, or Firm*—Oliff & Berridge, PLC (57) ABSTRACT

A tandem rotary electric machine for vehicles is equipped with a primary rotary electric machine and a secondary rotary electric machine arranged in tandem mechanism, namely, of a dual stator-rotor pair mechanism. In the tandem rotary electric machine, a connection lead wire connects a stator coil wound on a stator core of the primary stator-rotor pair to a rectifier device through one of accommodation parts formed in slots of the stator core of the secondary stator-rotor pair. This structure reduces the entire size or volume of the tandem rotary electric machine and increases the mechanical safety against the impact or force from outside.

4 Claims, 7 Drawing Sheets

FOREIGN PATENT DOCUMENTS

| | | |
|---|---|---|
| JP | A 01-157251 | 6/1989 |
| JP | A 05-500300 | 1/1993 |
| JP | 05137295 A * | 6/1993 |
| JP | A 05-137295 | 6/1993 |
| JP | 05308751 A * | 11/1993 |
| JP | A 05-308751 | 11/1993 |
| JP | 11243674 A * | 9/1999 |
| JP | A 11-243674 | 9/1999 |
| JP | 2002171723 A * | 6/2002 |
| JP | 2002171731 A * | 6/2002 |
| JP | A-2002-171723 | 6/2002 |
| JP | A 2002-171731 | 6/2002 |
| JP | A 2004-032882 | 1/2004 |
| JP | A 2004-032884 | 1/2004 |
| JP | A 2004-032890 | 1/2004 |
| JP | A 2004-032987 | 1/2004 |
| JP | A 2004-048939 | 2/2004 |
| JP | A 2004-048941 | 2/2004 |
| JP | A 2004-048967 | 2/2004 |
| JP | A 2004-064914 | 2/2004 |
| JP | 2005229748 A * | 8/2005 |
| JP | A 2005-229748 | 8/2005 |

* cited by examiner

TANDEM ROTARY ELECTRIC MACHINE

CROSS-REFERENCE TO RELATED APPLICATIONS

This application is related to and claims priority from Japanese Patent Applications No. 2005-201763 filed on Jul. 11, 2005, the contents of which are hereby incorporated by reference.

BACKGROUND OF THE INVENTION

1. Field of the invention

The present invention generally relates to a tandem rotary electric machine in tandem mechanism or a rotary electric machine, equipped with a single rotor shaft and dual stator-rotor pairs, applicable to various applications, movable bodies such as vehicles.

2. Description of the Related Art

The following prior-art patent documents D1 to D3 have disclosed a rotary electric machine equipped with dual stator-rotor pairs (hereinafter, referred to as "a tandem rotary electric machine"), in which dual Lundel type rotors are assembled in a tandem mechanism, and which is capable of generating different voltages independently.
D1: Japanese patent laid open publication NO. JP H1-157251;
D2: Japanese patent laid open publication NO. JP H5-137295; and
D3: Japanese patent laid open publication NO. JP H5-308751.

Further, the prior-art patent document D4 has disclosed an electrical machine such as alternator for motor cars having a dual pole system cooperating with dual stator windings.
D4: U.S. Pat. No. 5,233,249 (corresponding to Japanese patent laid open publication NO. JP H5-500300).

Using the tandem mechanism with the Lundel type rotors can reduce the entire size of a rotary electric machine. Such a tandem rotary electric machine is capable of controlling the electricity generation to generate and output different voltages independently. In other words, the tandem rotary electric machine can be manufactured with a compact size at a relatively low manufacturing cost. Further, such a tandem rotary electric machine can reduce its mounting space in a vehicle when compared with the case where two different non-tandem rotary electric machines are mounted on a vehicle.

Such a tandem rotary electric machine is used as a dual-voltage rotary electric machine having a double-voltage power system capable of generating and supplying both a normal 12-volt power source widely used and a 42 volt power source as a high voltage.

Because a rectifier device is placed or arranged at the outer end of a secondary stator-rotor pair along the axis direction of such a tandem rotary electric machine, it is necessary to electrically connect the stator of a primary stator-rotor pair to the rectifier device through lead wires (hereinafter, referred to as "connection lead wires").

The prior art patent document D2 has proposed to wire such connection lead wires on the outer peripheral end of the secondary stator-rotor pair along its radial direction.

The inventors according to the present invention have disclosed new stator-coil mechanism using a sequential segment joining type stator coil that is applicable to the rotary electric machine field. For example, following patent documents D5 to D12 have been disclosed. The sequential segment joining type stator coil can increase the occupancy or share rate of segment conductors (as a stator coil) in each slot, arrange the entire shape of the stator coil with a compact size, and thereby reduce the entire size of the rotary electric machine.
D5: Japanese patent laid open publication NO. JP 2004-048939;
D6: U.S. Pat. No. 6,774,528 and U.S. Pat. No. 6,995,492 (corresponding to Japanese patent laid open publication NO. JP 2004-048941);
D7: U.S. Pat. No. 6,979,926 and US publication No. 2006/0033394A1 (corresponding to Japanese patent laid open publication NO. JP 2004-064914);
D8: U.S. Pat. No. 6,825,589 (corresponding to Japanese patent laid open publication NO. JP 2004-048967);
D9: Japanese patent laid open publication NO. JP 2004-032987;
D10: U.S. Pat. No. 6,833,648 (corresponding to Japanese patent laid open publication NO. JP 2004-032882);
D11: US publication No. 2003/0233748A1 (corresponding to Japanese patent laid open publication NO. JP 2004-032884); and
D12: U.S. Pat. No. 6,910,257 (corresponding to Japanese patent laid open publication NO. JP 2004-032890).

Recent trend in this rotary electric machine field needs to further reduce the entire size and weight of the rotary electric machine. However, because the tandem rotary electric machine tends to increase the longitudinal length along its axis direction, there is a strong demand to reduce the entire size and weight of the rotary electric machine.

Although the patent document D2 has disclosed the manner to wire the connection lead wires along the axis direction at the outer peripheral end of a secondary stator-rotor pair in the tandem rotary electric machine, this manner increases the volume or size of the rotary electric machine along the radial direction in order to keep the electrical insulation of the connection lead wires and further to achieve the mechanical protection and thermal protection against outer impact and shock. As a result, this manner decreases the degree of adaptation of the tandem rotary electric machine to various applications, in particular, to vehicles equipped with various types of vehicle engines.

SUMMARY OF THE INVENTION

It is an object of the present invention to provide an improved tandem rotary electric machine having dual stator-rotor pairs in tandem mechanism with a simple configuration without increasing the total size, volume and weight.

According to one aspect of the present invention, a tandem rotary electric machine has a primary stator-rotor pair, a secondary stator-rotor pair, and a rectifier device. Each pair of the primary stator-rotor pair and the secondary stator-rotor pair has a rotor core on which field windings being wound and a stator core on which a stator coil being wound. Those rotor cores are fixed to a same rotary shaft and placed adjacently to each other in its axis direction, and driven simultaneously by the power of a vehicle engine, for example. The rectifier device is configured to rectify independently output powers such as output voltages provided from both the primary stator-rotor pair and the secondary stator-rotor pair. The rectifier device is placed at the outside portion of the secondary stator-rotor pair in the axial direction, and in particularly, separated from the primary stator-rotor pair. The tandem rotary electric machine further has a controller configured to control independently the exciting current flowing through the field windings of the rotor cores in both the primary and secondary stator-rotor pairs. Although it is preferred to use a Lundel type rotor core as the rotor core, the present invention is not limited by this manner and it is therefore acceptable to use another types of rotor cores other than the Lundel type. Further, the concept of the present invention is also applicable to an electric motor as the rotary electric machine, to a vehicle stator, for example. Still further, it is possible to add an additional stator-rotor pair in tandem mechanism in addition to the configuration of the dual stator-rotor pairs.

The tandem rotary electric machine according to one aspect of the present invention has one of features in which the stator coil of the primary stator-rotor pair is electrically connected to the rectifier device through a connection lead wire that is penetrated in an accommodation part formed in a slot of the stator core of the secondary stator-rotor pair. Because the stator coil of the primary stator-rotor pair is electrically connected to the rectifier device through the connection lead wire penetrated through the slot of the stator core of the secondary stator-rotor pair placed near the rectifier device, it is possible to prevent any expansion of the entire volume or size of the tandem rotary electric machine in the radial direction.

Because the slot occupancy rate becomes low, namely only is increased a little even if the secondary stator-rotor pair uses a normal wire-wound stator coil as its stator coil when compared with the case of the primary stator-rotor pair, it is possible to penetrate easily the connection lead wire through the slot of the stator core using the normal wire-wound stator coil of the secondary stator-rotor pair.

According to another aspect of the present invention, the stator coil wound on the stator cores in both the primary stator-rotor pair and the secondary stator-rotor pair are sequential segment joining type stator coil. Each of the sequential segment joining type stator coil is inserted in the corresponding slot formed in the stator core in one direction and adjacent front terminals of the adjacent sequential segment joining type stator coil are electrically connected by welding in order to form the stator coil. The stator core of the secondary stator-rotor pair has a slot having plural accommodation parts and the connection lead wire is penetrated through at least one accommodation part where no segment conductor is inserted and penetrated. It is thereby possible to penetrate the connection lead wire to one accommodation part in the slot in the stator core of the secondary stator-rotor pair without difficulty and causing any problem when the sequential segment joining type stator coil of a high occupancy rate in slot are used as the stator coil.

Further, according to another aspect of the present invention, the connection lead wire is penetrated through the slot of the stator core of the secondary stator-rotor pair. The connection lead wire includes a lead wire to be used for penetrating through a slot, one end of the lead wire is electrically connected to one end of the stator coil in the primary stator-rotor pair. That is, according to the aspect of the present invention, the lead wire connected to one end of the stator coil of the primary stator-rotor pair is not used as the connection lead wire, namely, this lead wire is not penetrated through the slot of the stator core of the secondary stator-rotor pair. The connection lead wire that is penetrated in advance through the slot in the stator core of the secondary stator-rotor pair is used and electrically connected to the one end of the stator coil of the primary stator-rotor pair. This manner can reduce the manufacturing steps and time.

Still further, according to another aspect of the present invention, the connection lead wire is penetrated through the slot of a same phase of the stator core of the secondary stator-rotor pair. That is, the armature current of the primary stator-rotor pair flowing through the connection lead wire becomes a half-turn stator current in the slot of the stator core of the secondary stator-rotor pair. This can avoid the occurrence of fluctuation of magnetic field in the secondary stator-rotor pair by the phase current flowing through the stator coil of the primary stator-rotor pair.

Still further, according to another aspect of the present invention, both the primary stator-rotor pair and the secondary stator-rotor pair have the same number of the stator cores having a same sectional shape, and have the same sectional area of the sequential segment joining type stator coil. This can achieve a simplification of the manufacturing process.

Moreover, according to another aspect of the present invention, the tandem rotary electric machine has a slip ring power supply mechanism and a controller. The slip ring power supply mechanism is configured to supply electric power to both the field windings of the primary stator-rotor pair and the secondary stator-rotor pair. The controller has field current control elements such as transistors fixed to both the rotor cores. The field current control elements are configured to independently control exciting currents flowing through the field windings of the rotor cores of the primary stator-rotor pair and the secondary stator-rotor pair.

That is, according to the tandem rotary electric machine of the present invention, the common slip ring power supply mechanism can supply the electric power to both the field windings of the rotor cores of both the primary and secondary stator-rotor pairs. This can achieve the simplification of the entire configuration of the tandem rotary electric machine and reduce the friction loss caused by the brushes, and thereby reduce the entire size and weight of the rotary electric machine.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

A tandem rotary electric machine or a vehicle alternator according to the present invention is applicable to various devices and mounted on movable bodies such as a vehicle.

First Embodiment (Entire Configuration)

The entire configuration of a tandem electric rotary machine for vehicle (or a vehicle alternator) according to the first embodiment of the present invention will now be described with reference to FIG. 1.

Figure 1:
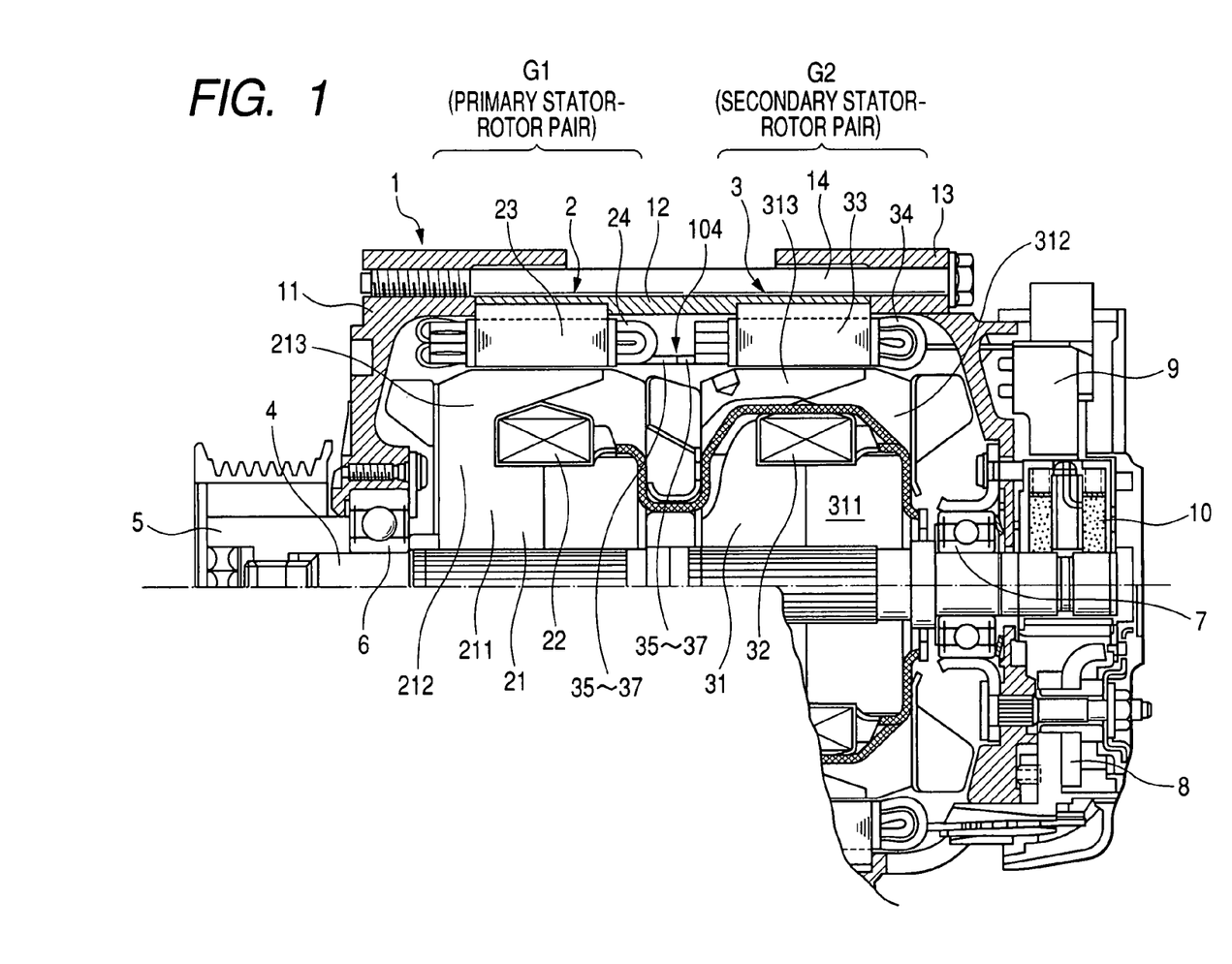
FIG. 1 is a schematic sectional diagram of a tandem rotary electric machine having dual stator-rotor pairs according to a first embodiment of the present invention.

FIG. 1 is a sectional view along a rotor shaft direction of the tandem electric rotary machine having dual stator-rotor pairs, a primary rotary electric machine section 2 (also referred to as G1 in the diagrams) and a secondary rotary electric machine section 3 (or referred to as G2 in the diagrams), arranged in a tandem mechanism according to the first embodiment. The tandem electric rotary machine has a housing 1, the primary rotary electric machine section 2 (G1), the secondary rotary electric machine section 3 (G2), a rotor shaft 4, a pulley 5, bearings 6 and 7, a rectifier 8, a regulator 9, and a slip ring power supply device 10.

As shown in FIG. 1, the housing 1 comprises a front housing 11, a center housing 12, and a rear housing 13. Those housing components 11, 12, 13 of the housing 1 are fixed tightly together by through bolts 14. The rotor shaft 4 is supported to the housing 1 through the bearings 6 and 7. The pulley 5 is fixed to the front end part of the rotor shaft 4 that protrudes from the front end surface of the housing 1. The rectifier device 8, the regulator 9, and the slip ring power supply device or mechanism 10 are fixed to the rear housing 13 placed at the rear end of the secondary rotary electric machine section 3 (G2).

The primary rotary electric machine has a primary stator-rotor pair that has made of a Lundel type rotor core 21, field coil 22, a stator core 23, and stator coil 24. The individual field coil 22 is wound on the Lundel type rotor core 21. The stator core 23 is arranged in radial direction on the outer surface of the Lundel type rotor core 21. The individual stator coil 24 is wound on the stator core 23.

The Lundel type rotor core 21 is made of a pair of half core bosses faced to each other. Each half core boss has a boss section 211, a pole section 212 as a claw base part extended outside from the boss section 211 in the radial direction, and a claw part 213 (a claw pole or a claw magnetic pole). The field coil 22 is wound on the boss section 211 of the Lundel type rotor core 21. The stator core 23 is placed tightly between the front housing 11 and the center housing 12. The stator coil 24 is wound on the stator core 23.

The secondary rotary electric machine section 3 (G2) has a secondary stator-rotor pair that is made of a Lundel type rotor core 31, a field coil 32, a stator core 33, and a stator coil 34. The individual field coil 32 is wound on the Lundel type rotor core 31. The stator core 33 is arranged in the radial direction on the outer surface of the Lundel type rotor core 31. The individual stator coil 34 is wound on the stator core 33.

The Lundel type rotor core 31 is made of a pair of half core bosses faced to each other. Each half core boss has a boss section 311, a pole section 312 as a claw base part extended outside from the boss section 311 in the radial direction, and a claw part 313 (a claw pole or a claw magnetic pole). The field coil 32 is wound on the boss section 311 of the Lundel type rotor core 31. The stator core 33 is placed tightly between the center housing 12 and the rear housing 13. The stator coil 34 is wound on the stator core 33. Because each of the primary rotary electric machine section 2 (G1) and the secondary rotary electric machine section 3 (G2) has the well-known typical Lundel type rotor core, the explanation for the configuration and operation is omitted here.

(Explanation for Circuit Configuration)

A description will now be given of the circuit configuration of the tandem rotary electric machine of the present invention with reference to FIG. 2.

The stator coil 24 has three phase windings U, V, and W in a star connection and provide a three phase AC voltage to a three phase full wave rectifier 81. The three phase full wave rectifier 81 performs the full wave rectifying and supplies the output current i1 to the outside of the rotary electric machine.

The output terminals of the phase windings U, V, and W are connected to three AC input terminals 811, 812, and 813 of the three phase full wave rectifier 81 through connection lead wires 35, 36, and 37, respectively.

Similarly, the stator coil 34 has three phase windings U', V', and W' in a star connection and provide a three phase AC voltage to a three phase full wave rectifier 82. The three phase full wave rectifier 82 performs the full wave rectifying and supplies the output current i2 to the outside of the rotary electric machine.

The output terminals of the phase windings U', V', and W' are connected to three AC input terminals of the three phase full wave rectifier 82 through connection lead wires, respectively. The reference characters U and U' designate the same phase, V and V' denote the same phase, and also U and U' indicate the same phase. The stator coil 24 in the primary stator-rotor pair has the phase windings U, V, and W, and the stator coil 34 in the secondary stator-rotor pair has the phase windings U', V', and W'.

The slip ring power supply device 10 has a pair of slip rings. One of the slip rings is a common terminal of the field windings connected to the ground voltage level. The other of the slip rings is connected to a positive terminal of a battery (not shown) through which the voltage of the battery is supplied.

A pair of field current control transistors is fixed to each of the rotor cores 21 and 31. Those field control transistors controls independently the field current flowing through the field coil 22 in the primary stator-rotor pair and the field current flowing through the field coil 32 in the secondary stator-rotor pair.

The regulator 9 controls ON/OFF operation of those field current control transistors in order to control the magnitude of the field current in the field coils 22 and 32, independently.

The stator coil 34 of the secondary rotary electric machine section 3 has a large turn number rather than that of the stator coil 24 of the primary rotary electric machine section 2. The primary rotary electric machine section 2 provides a normal voltage power (as a low voltage 12 Volts, for example). Through the embodiments of the present invention, the low voltage power, the 12V power is normally provided to and used by low voltage loads (not shown) in a vehicle. The primary rotary electric machine section 2 continuously provides the 12V power to those low voltage loads which need the low voltage power of 12V at all times (as a high priority power source).

On the contrary, the secondary rotary electric machine section 3 generates and provides a high voltage power (42 volts, for example) to high voltage loads (not shown) incorporated in a vehicle. The secondary rotary electric machine section 3 provides the 42V power to those high voltage loads (not shown) which need the high voltage power of 42V optionally (as a low priority power source).

(Explanation for the Stator Coil 24 and the Stator Coil 34)

A description will now be given of the configuration of the stator coil 24 in the primary rotary electric machine section 2 and the stator coil 34 in the secondary rotary electric machine section 3 in the tandem rotary electric machine of the embodiment with reference to FIG. 1.

Each of the stator coils 24 and 34 is made of sequential segment joining type stator coil which has been disclosed in the patent documents D5 to D12, and some of the inventors of which are also the inventors of the present invention.

In the structure of each of the stator coils 24 and 34 using the sequential segment joining type stator coil, the leg parts (as a line part) of a pair of segment conductors of a U-shape are firstly inserted independently along the axis direction into slots of the stator cores. The slot are separated to each other by the electric angle of $\pi$. The front parts of a pair of the U-shaped segment conductors extended from those slots are then welded sequentially in order to form wave-shaped windings or overlap-shaped windings. The patent documents D5 to D12 have disclosed the configuration and manufacturing manners of the stator coil wound on the stator cores using the sequential segment joining type stator coil. The explanation for them is therefore omitted here.

The number of the slots in the stator core and the number of segment conductors per slot are selected optionally according to various applications.

Figure 6:
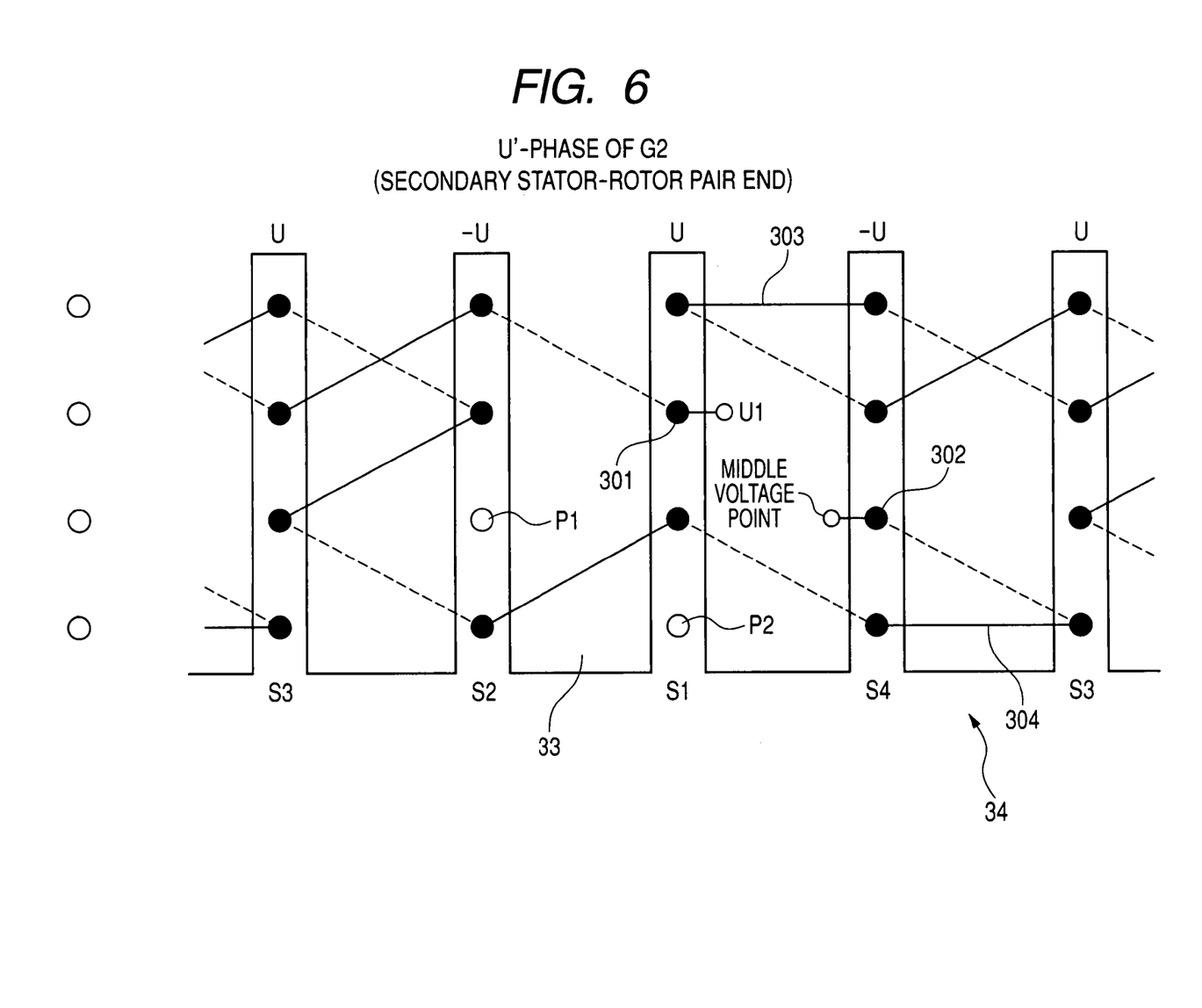
FIG. 6 is a schematic diagram showing a placement of stator coil of the primary stator-rotor pair placed at the frond end of the tandem rotary electric machine according to the fourth embodiment.
Figure 7:
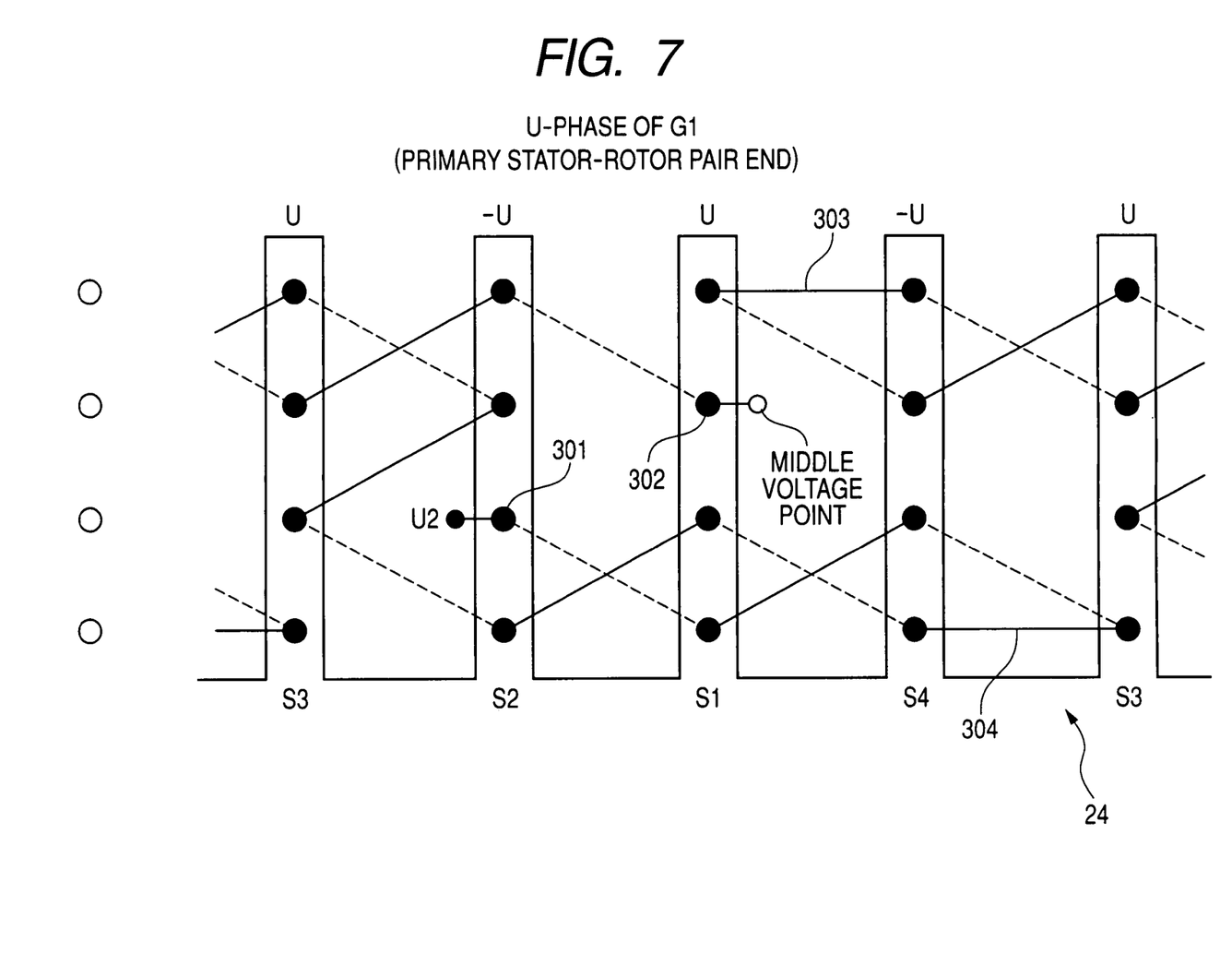
FIG. 7 is a schematic diagram showing a placement of stator coil of the secondary stator-rotor pair placed at the rear end of the tandem rotary electric machine according to the fourth embodiment.

As shown in FIG. 1, FIG. 6, and FIG. 7, each slot has four segment accommodation parts along the radial direction of the stator core to which four sequential segments for the stator coil 24 and the stator coil 34 are inserted and fixed.

The leg parts of large segment conductors are inserted into the first and fourth accommodation parts at the innermost end and the outermost end of each slot and the leg parts of small segment conductors are inserted into the secondary and third accommodation parts at the middle end of the slot. However, the present invention is not limited by the above accommodation manner of the segment conductors (SCs) according to the various applications and demands.

Each phase winding of the three phases (U. V, and W) of the stator coil 24 has N1/3 small segment conductors and N1/3 large segment conductors, where N1 is the number of slots in the stator core 23, and N2 is the number of slots in the stator core 33. Each phase winding of the three phases (U, V, and W) has N1/3 small segment conductors, and N1/3 large segment conductors. The stator coil 24 is a small coil part made of N1/3 small sequential conductors (SCs) connected to each other sequentially, and a large coil part made of N1/3 large sequential conductors (SCs) connected to each other sequentially, where the small SCs and the large SCs are connected in series.

Similar to the stator coil 24, each phase winding of the three phases (U', V', and W') of the stator coil 34 has N2/3 small segment conductors and N2/3 large segment conductors, where N2 is the number of slots in the stator core 33. Each phase winding of the three phases (U', V', and W') has N2/3 small segment conductors and N2/3 large segment conductors. Each stator coil 34 is a small coil part made of N2/3 small sequential conductors (SCs) connected to each other sequentially, and a large coil part made of N2/3 large sequential conductors (SCs) connected to each other sequentially, where the small SCs and the large SCs are connected in series. As described later, the turn number of each of the three phase windings U', V', and W' in the stator coil 34 is less one turn.

In more detailed, each of the phase windings U', V', and W' of the stator coil 34 of the secondary stator-rotor pair 3 arranged at the rectifier device end (or at the rear end) of the tandem rotary electric machine of the embodiment is less the primary half turn and the final half turn. In addition, the primary segment conductor (SC) and the final segment conductor (SC) of each of the phase windings U', V', and W' of the stator coil 34 of the secondary stator-rotor pair 3 is made of the I-shaped SC, not the U-shapes SC. The primary I-shaped SC as the primary half turn of each of the phase windings U', V', and W' acts as a terminal lead wire of each of the phase windings U', V', and W'. Further, the final I-shaped SC as the final halt turn of each of the phase windings U', V', and W' is connected to each other and becomes an intermediate voltage node. The terminal lead wire is connected to the connection lead wire through which the stator coil is electrically connected to the rectifier device 8.

In the stator core 33, a pair of the segment conductor accommodation parts that are separated to each other by electric angle of $\pi$ becomes space area where no segment conductor is inserted. The space area of those segment conductor accommodation parts are designated by the reference characters P1 and P2, for example, as shown in FIG. 6.

That is, in the secondary rotary electric machine section 3 (G2), each of the stator windings U', V', and W' of the stator coil 34 of the secondary stator-rotor pair has ((2N2/3)−1) turns that is less by one turn when compared with the normal turn-number (2N2/3).

On the contrary, in the primary rotary electric machine section 2 (G1), each of the stator windings U, V, and W of the stator coil 24 of the primary stator-rotor pair has (2N/3) turns. The primary segment conductor (SC) and the final segment conductor (SC) of each of the phase windings U, V, and W of the stator coil 24 of the primary stator-rotor pair is made of a I-shaped SC, not U-shapes SC. The primary I-shaped SC of each of the phase windings U, V, and W becomes a terminal lead wire of each of the phase windings U, V, and W. Further, the final I-shaped SC of each of the phase windings U, V, and W is connected to each other and becomes an intermediate voltage node. Each of the stator windings U, V, and W of the stator coil 24 of the primary stator-rotor pair therefore has (2N1/3) turns.

The terminal lead wires 101, 102, and 103 of the phase windings of the stator coil 24 in the primary stator-rotor pair of the primary rotary electric machine section 2 (G1) must run or be wired to the AC input terminals of the three phase full wave rectifier device 8 over the secondary stator-rotor pair in the secondary rotary electric machine section 3 (G2) along the axis direction of the secondary rotary electric machine 3 (G2).

In particular, according to the configuration of the embodiment of the present invention shown in FIG. 1 and FIG. 6 and FIG. 7, the connection lead wires 35, 36, and 37 are inserted through the segment conductor accommodation parts P1 or P2 (see FIG. 6) of space are and the terminal lead wires 101, 102, and 103 of the phase windings U, V, and W in the primary stator-rotor pair are connected to the AC input terminals 811, 812, and 813, respectively through the connection lead wires 35, 36, and 37 that penetrate through the segment conductor accommodation parts P1 or P2. Further, the front part of the terminal lead wire 101 of the U phase winding is connected to the front part of the connection lead wire 35 by welding. The front part of the terminal lead wire 102 of the V phase winding is connected to the front part of the connection lead wire 36 by welding. The front part of the terminal lead wire 103 of the W phase winding is connected to the front part of the connection lead wire 37 by welding. The rear part of the connection lead wire 35 is connected to the AC input terminal 811 of the three phase full wave rectifier device 81. The rear part of the connection lead wire 36 is connected to the AC input terminal 812 of the three phase full wave rectifier device 81. The rear part of the connection lead wire 37 is connected to the AC input terminal 813 of the three phase full wave rectifier device 81.

According to the configuration of the tandem rotary electric machine having the above configuration of the connection lead wires 811, 812, and 813 and the terminal lead wires 101, 102, and 103 in the primary stator-rotor pair and the secondary stator-rotor pair, it is possible to connect the stator coil 24 in the primary rotary electric machine G1 to the three phase full wave rectifier 81 of the rectifier device 8 efficiently with a compact size without increasing the entire volume or size of the tandem rotary electric machine in addition to the effect obtained by using the sequential segment joining type stator coil having a high occupancy or share of segment conductors (as the stator coil 34) in each slot.

MODIFICATIONS

A description will now be given of various modifications of the configuration of the tandem rotary electric machine of the present invention with reference to FIG. 1.

In the embodiment described above, the sequential segment joining type stator coil is adapted to the stator coil 24 in the primary stator-rotor pair of the primary rotary electric machine section 2 (G1). The present invention is not limited by this configuration. For example, it is possible to apply to the normal wire-wound stator coil, not the sequential segment joining type stator coil, the concept of the present invention, regarding the connection of the connection lead wires and the lead wires. In the winding type stator coil, because coil conductors of a round-cable shape and a circle sectional area are inserted into corresponding slots in the stator cores 23 and 33, the occupancy rate or share rate of the wires in each slot is small and an idle spaces are present in the slots. Therefore it is possible to insert easily the connection lead wires 35, 36, and 27 into the idle spaces in the slots after the completion of the windings of the stator coil.

Figure 2:
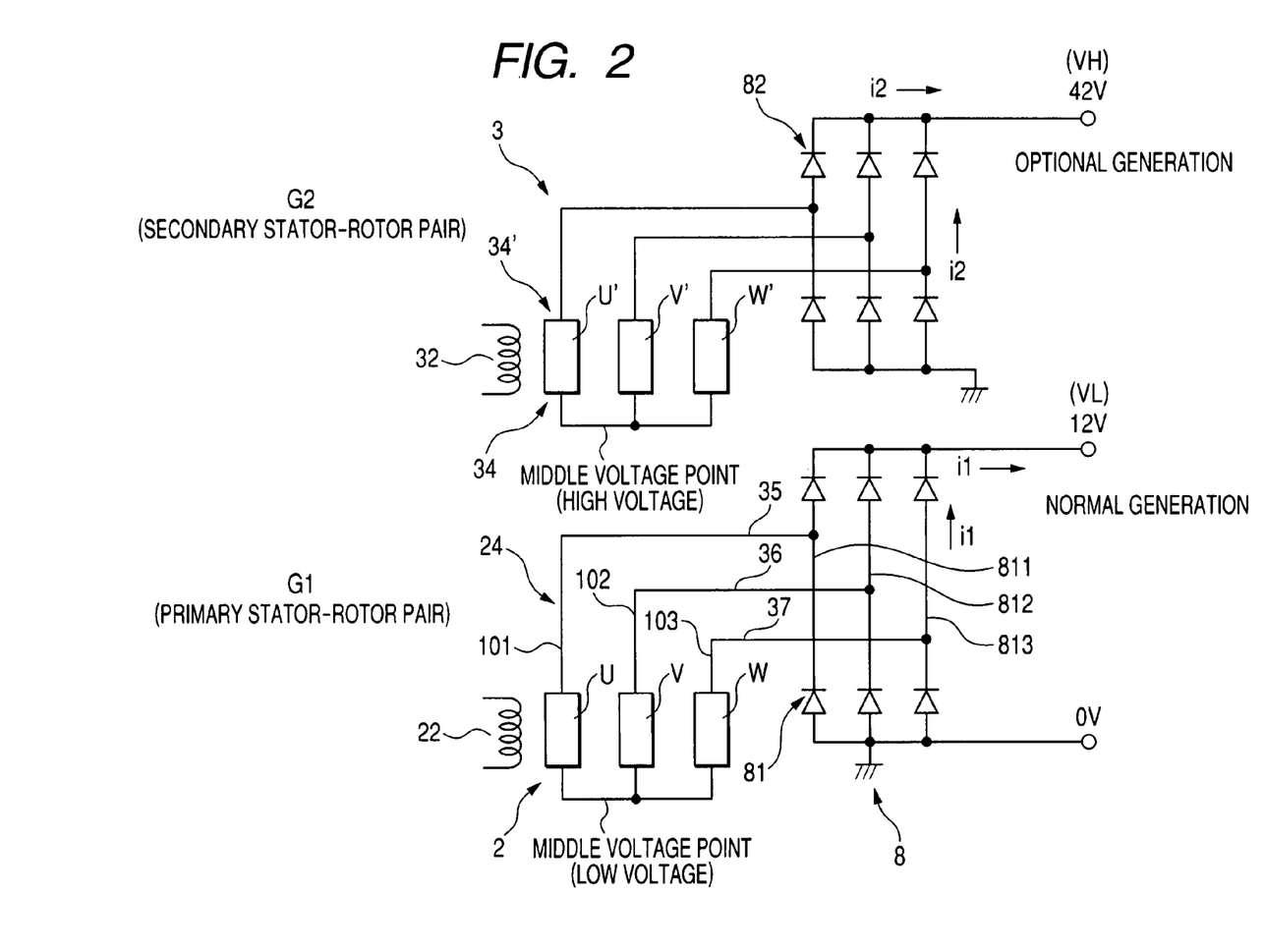
FIG. 2 is a circuit diagram of the tandem rotary electric machine shown in FIG. 1.

It is preferred that the connection lead wire 35 connected to the U phase coil of the stator coil 24 is connected to the rectifier device 8 through the slot through which the U' phase coil (as shown in FIG. 2) of the stator coil 34 is inserted. That is, it is preferred to flow the current in the U'phase sequential segment conductor of the stator coil 34 and the current in the connection lead wire 35 in the same direction, namely, the same phase. Similarly, it is preferred that the connection lead wire 36 connected to the V phase coil of the stator coil 24 is connected to the rectifier device 8 through the slot through which the V' phase coil (as shown in FIG. 2) of the stator coil 34 is inserted. That is, it is preferred to flow the current in the V' phase sequential segment conductor of the stator coil 34 and the current in the connection lead wire 36 in the same direction, namely the same phase. Still similarly, it is preferred that the connection lead wire 37 connected to the W phase coil of the stator coil 24 is connected to the rectifier device 8 through the slot through which the W' phase coil (as shown in FIG. 2) of the stator coil 34 is inserted. That is, it is preferred to flow the current in the W' phase sequential segment conductor-of the stator coil 34 and the current in the connection lead wire 37 in same direction (same phase).

Second Embodiment

Figure 3:
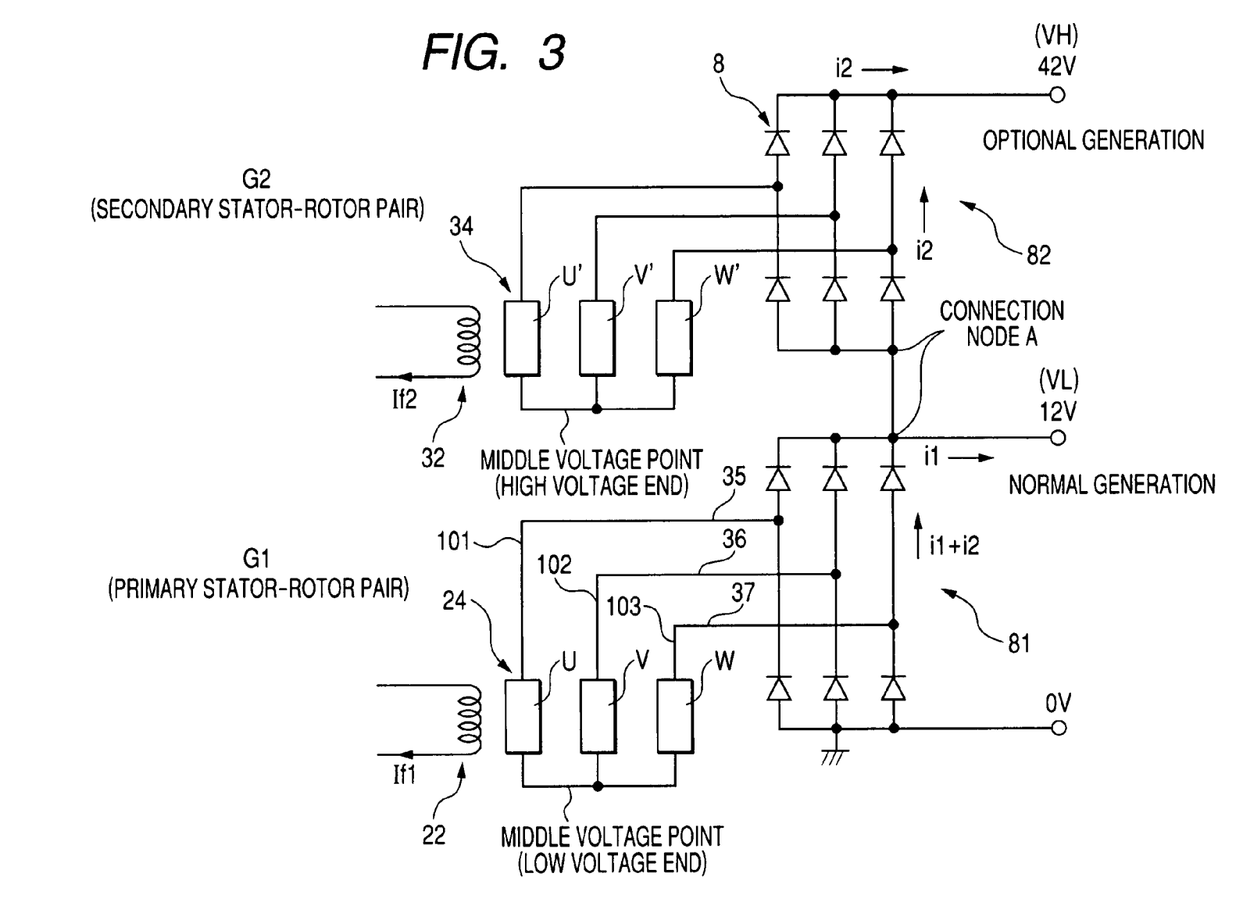
FIG. 3 is a circuit diagram of the tandem rotary electric machine according to a second embodiment of the present invention.

A description will now be given of the configuration of the tandem rotary electric machine according to the second embodiment of the present invention with reference to FIG. 3.

In the second embodiment, a DC high voltage output terminal of the three phase full wave rectifier 81 for the primary rotary electric machine section 2 (G1) is connected to the DC low voltage output terminal of the three phase full wave rectifier 82 for the secondary rotary electric machine section 3 (G2) through a connection node A.

It is possible to adjust the output voltage (12 Volts) and output current from the three phase full wave rectifier 81 by adjusting the magnitude of the exciting current If1 to be flowing into the field coil 22. Similarly, it is possible to adjust the output voltage (42 Volts) and output current from the three phase full wave rectifier 82 by adjusting the magnitude of the exciting current If2 to be flowing into the field coil 32. Thus, through the connection node A, both the high DC voltage (42 Volts) output terminal of the three phase full wave rectifier 81 is connected to the low DC voltage (12 Volts) output terminal of the three phase full wave rectifier 82. This configuration reduces the load of the secondary rotary electric machine (G2) for generating high voltage (42 Volts).

Third Embodiment

A description will now be given of the configuration of the tandem rotary electric machine according to the third embodiment of the present invention with reference to FIG. 4.

Figure 4:
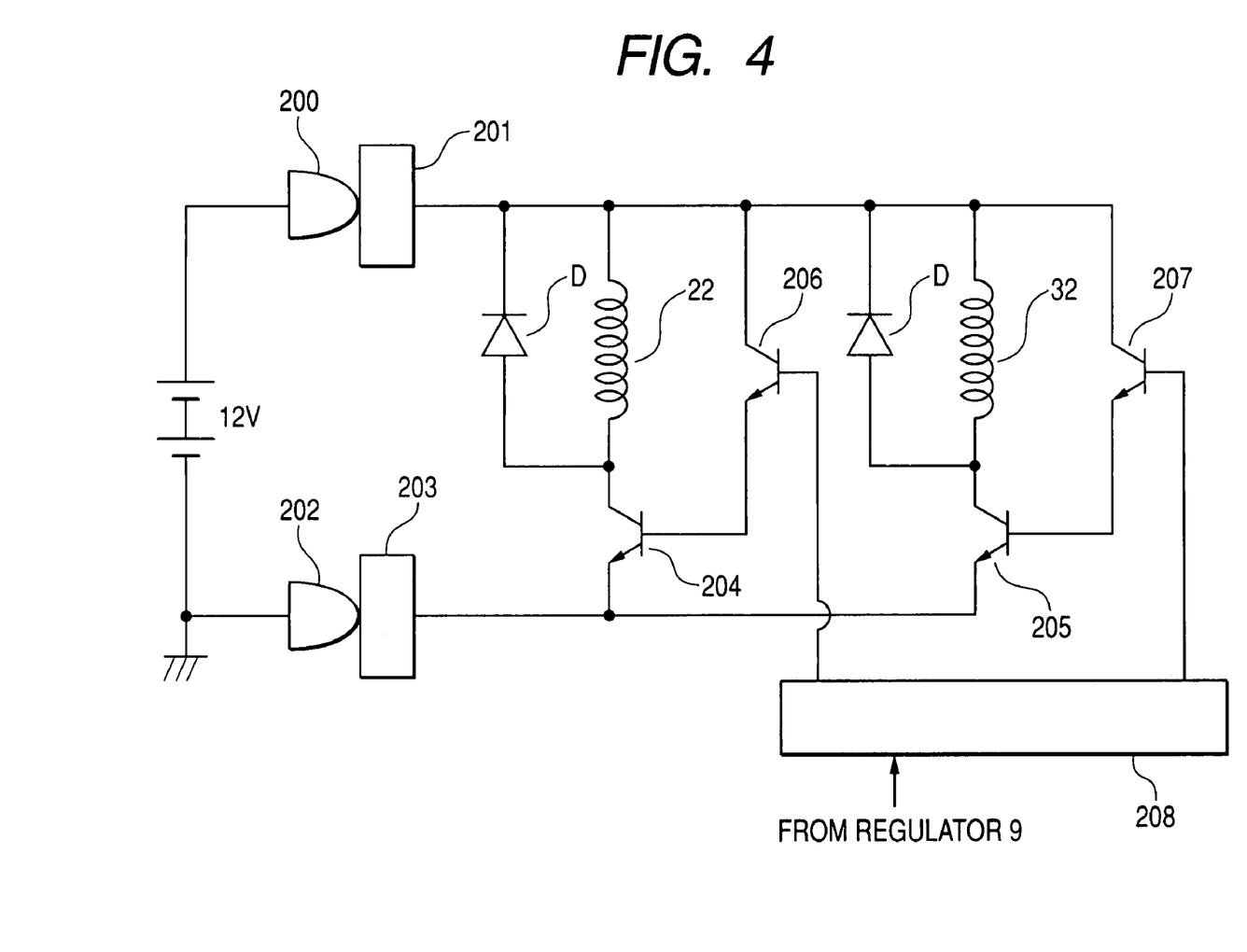
FIG. 4 is a diagram showing an exciting current control circuit in the tandem rotary electric machine according to a third embodiment of the present invention.

As shown in FIG. 4, the slip ring power supply device 10 has a pair of brush 200 and a slip ring 201 contacted to the brush 200, and a pair of brush 202 and a slip ring 203 contacted to the brush 202. Reference number 204 designates a transistor for controlling ON/OFF operation of the exciting current flowing through the field coil 22. Reference number 205 denotes a transistor for controlling ON/OFF operation of the exciting current flowing through the field coil 32. Reference number 206 indicates an emitter follower transistor for amplifying the base current of the transistor 204, 207 designates an emitter follower transistor for amplifying the base current of the transistor 205, and reference character D indicates fly wheel diodes. Those electric components such as the transistors 204, 205, 206, and 207, and the fly wheel diodes D are fixed to and mounted on the rotor core and are rotated by the rotation of the rotor core. Reference number 208 designates a de-multiplexer, mounted on the rotor core, configured to distribute control signals to be transferred optically from the regulator 9 mounted on the regulator 9 through optical devices such as rotary photo couplers under non-contact condition. As described above, the third embodiment can make the slip ring mechanism with a simple configuration, and thereby reduce the entire size of the tandem rotary electric machine.

Fourth Embodiment

Figure 5:
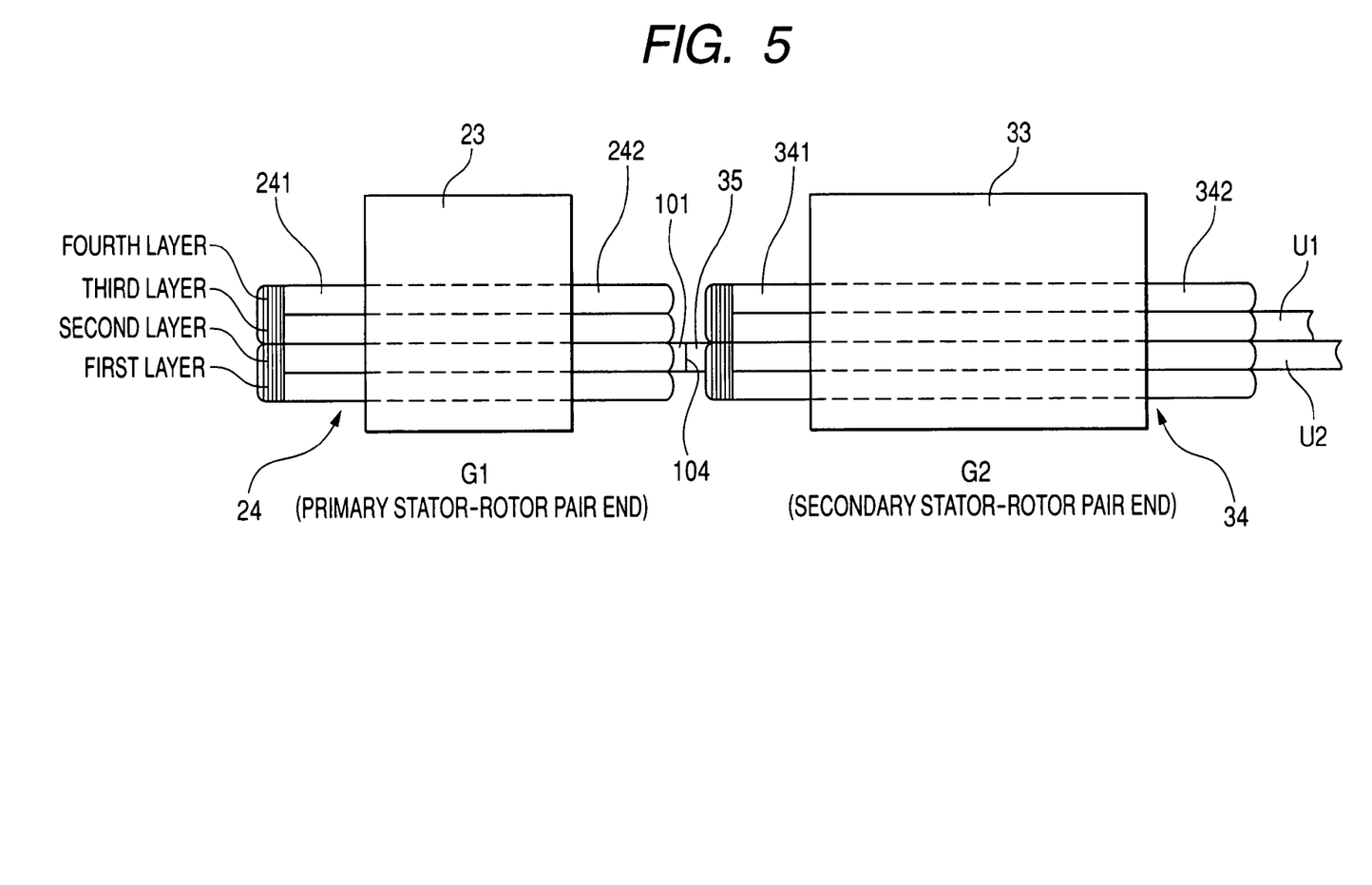
FIG. 5 is a schematic diagram showing a placement of stators and stator coil in both a primary and secondary stator-rotor pairs of the tandem rotary electric machine according to a fourth embodiment of the present invention.

FIG. 5 is a schematic diagram showing a placement of the stators and the stator coil in both the primary and secondary stator-rotor pairs of the tandem rotary electric machine according to the fourth embodiment of the present invention.

Each phase of the stator coil 24 has a primary coil and a secondary coil connected in series. The primary coil is made of the sequential segment conductors inserted to and accommodated in the corresponding conductor accommodation part of the first and second layers in each slot. The secondary coil is made of the sequential segment conductors inserted to and accommodated in the corresponding conductor accommodation part of the third and fourth layers in each slot. Similarly, each phase of the stator coil 34 has a primary coil and a secondary coil connected in series. The primary coil is made of the sequential segment conductors inserted to and accommodated in the corresponding conductor accommodation part of the first and second layers in each slot. The secondary coil is made of the sequential segment conductors inserted to and accommodated in the corresponding conductor accommodation part of the third and fourth layers in each slot.

FIG. 6 shows the placement or arrangement of the stator coil of the U' phase in the secondary stator-rotor pair 3 of the secondary rotary electric machine section 3 (G2), when the number of the slots in each phase of the stator core 33 is four. FIG. 7 shows the placement or the arrangement of the stator coil of the U phase in the primary stator-rotor pair of the primary rotary electric machine section 2 (G1) when the number of the slots in each phase of the stator core 33 is four.

In both FIG. 6 and FIG. 7, the solid lines show U-shaped head parts of the coil ends 242 and 342 of the U-shaped segment conductors placed or arranged at the rear end of the primary stator-rotor pair and the secondary stator-rotor pair. Further, the dotted lines show both leg parts 241 and 341 of the coil ends of the U-shaped segment conductors placed or arranged at the front end of the primary stator-rotor pair and the secondary stator-rotor pair.

As shown in FIG. 6, the reference characters P1 and P2 indicate the idle space in the slots S1 and S2 of the stator core 33 in the secondary stator-rotor pair of the secondary rotate electric machine section 3 (G2) supplying the high voltage (42 Volts) power. Reference number 301 denotes an I-shape sequential segment conductor as the terminal lead wire of the U phase winding of the stator core 33. The I-shape sequential segment conductor 301 also becomes the start end portion of the stator coil 34 wound on the stator core 33. Reference number 303 designates an I-shape sequential segment conductor as the terminal end portion of the stator coil 34 wound on the stator core 33. The I-shape sequential segment conductor 303 becomes the middle voltage point. Reference characters S1 to S4 denote slot numbers.

The connection lead wire connected to the I-shaped sequential segment conductor 301 as the start end of the U' phase winding is connected to the rectifier device 8 through the connection lead wire inserted in one of the idle spaces P1 and P2. Thus, the I-shaped sequential segment conductor 301 is connected to the rectifier device 8 through the connection lead wire and the connection lead wire penetrated through the idle space P1 or P2 where no segment conductor is inserted. The selection of the idle space P1 or P2 can be performed according to its working efficiency.

After the completion of the manufacturing of the tandem rotary electric machine, the lead wire becomes a part of the connection lead wire through which the stator coil is electrically connected to the rectifier device 8.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A tandem rotary electric machine comprising:
a primary stator-rotor pair and a secondary stator-rotor pair,
each pair comprising:
a rotor core on which field windings are wound and a stator core on which a stator coil is wound;
a rectifier device, configured to rectify voltages generated by both of the stator coils, placed at the outside of the secondary stator-rotor pair in its axial direction and separated from the primary stator-rotor pair; and
a controller configured to independently control field currents of both the primary stator-rotor pair and the secondary stator-rotor pair, wherein
both of the rotor cores are arranged adjacent to each other, fixed to a same rotary shaft, and driven by a vehicular engine,
a stator winding of each phase of the stator coil in the primary stator-rotor pair has $(2N_1/3)$ turns, and a stator winding of each phase of the stator coil in the secondary stator-rotor pair has $((2N_2/3) - 1)$ turns, where a number of slots in the primary stator-rotor pair is $N_1$ and a number of slots in the secondary stator-rotor pair is $N_2$, and
the stator coil of the primary stator-rotor pair is connected to the rectifier device through a connection lead wire penetrated through a specified slot of the stator core in the secondary stator-rotor pair.

2. The tandem rotary electric machine according to claim 1, wherein the stator coil of the secondary stator-rotor pair is composed of sequential segment joining type stator coils which are inserted in each slot of the stator core and sequentially connected through an end part of each sequential segment joining type stator coil, and
the connection lead wire is inserted and penetrated in at least one of idle spaces in the specified slot of the stator core in the secondary stator-rotor pair, which is obtained by a decreased turn number of the stator windings, and no sequential segment joining type stator coils as the stator coil of the secondary stator-rotor pair are accommodated in the idle spaces.

3. The tandem rotary electric machine according to claim 1, wherein the connection lead wire has a slot penetrating lead wire which is inserted in the specified slot of the stator core of the secondary stator-rotor pair, and one end of the connection lead wire is connected to one end of the stator coil of the primary stator-rotor pair.

4. The tandem rotary electric machine according to claim 1, wherein the connection lead wire is inserted and penetrated through the idle space in the specified slot in a same phase of the stator core of the secondary stator-rotor pair.

* * * * *